Figure 9:
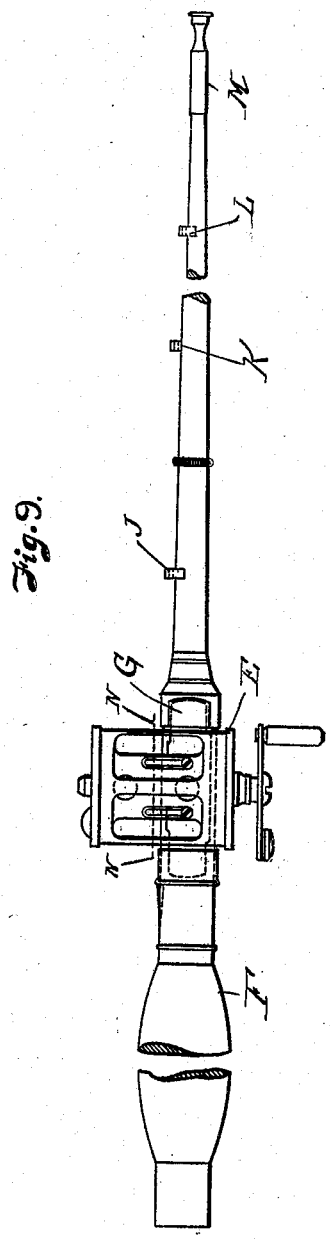

J. F. SCANLAN.
FISHING POLE.
APPLICATION FILED JULY 6, 1908.
919,778.
Patented Apr. 27, 1909.
2 SHEETS—SHEET 1.
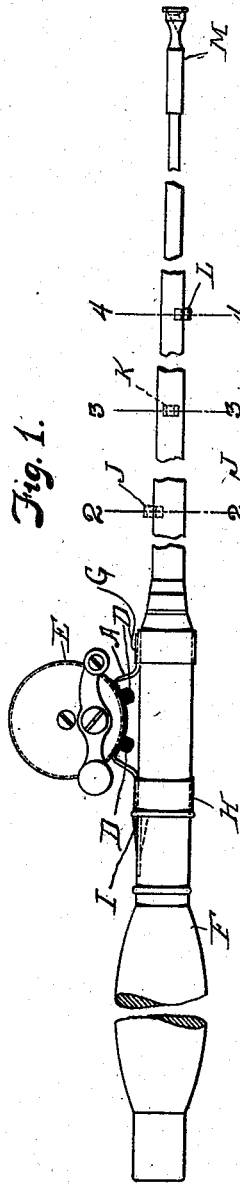
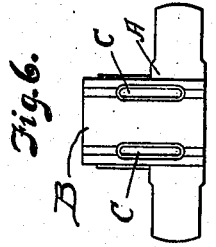
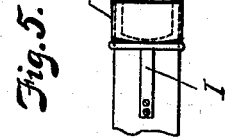
WITNESSES:
INVENTOR
John F. Scanlan
BY
ATTORNEY

J. F. SCANLAN.
FISHING POLE.
APPLICATION FILED JULY 6, 1908.

919,778.

Patented Apr. 27, 1909.
2 SHEETS—SHEET 2.

WITNESSES:

INVENTOR
John F. Scanlan
BY
ATTORNEY

UNITED STATES PATENT OFFICE.

JOHN F. SCANLAN, OF CHICAGO, ILLINOIS.

FISHING-POLE.

No. 919,778.　　　Specification of Letters Patent.　　　Patented April 27, 1909.

Application filed July 6, 1908. Serial No. 442,122.

*To all whom it may concern:*

Be it known that I, JOHN F. SCANLAN, citizen of the United States, residing at Chicago, in the county of Cook and State of Illinois, have invented certain new and useful Improvements in Fishing-Poles; and I do hereby declare the following to be a full, clear, and exact description of the invention, such as will enable others skilled in the art to which it appertains to make and use the same.

My invention relates to a novel construction in a fishing pole, the object being to provide a device of this character in which the reel mounting and guides coact to render easier and more convenient the operation of the pole, and consists in the features of construction and combinations of parts hereinafter fully described and claimed.

In the accompanying drawings illustrating my invention: Figure —1— is a side elevation of a fishing pole constructed in accordance with my invention. Figs. —2—, —3— and —4— are detail transverse sections of the same on the lines 2—2, 3—3 and 4—4 respectively of Fig. —1—. Fig. —5— is a fragmentary detail view in elevation showing a spring latch employed. Fig. —6— is a detail top plan view of the reel plate employed. Fig. —7— is a longitudinal section of the reel plate showing the reel frame mounted thereon. Fig. —8— is a detail transverse section through the interfitting ferrules of a jointed pole. Fig. —9— is a plan view of the rod showing the relative positions of the reel, and guides.

Fishing poles of the type used particularly in casting and on which reels are employed, have a constant tendency to turn in the hand owing to the weight of the reel which is most generally supported upon the top of the pole, this position being preferred by anglers for the reason that it enables the reel and line to be controlled by the thumb, such control being essential to the prevention of entanglement of the line.

Conforming to the position of the reel, the guides for the line consisting of eyelets secured to the pole at intervals between its ends and of a ferrule at the tip, are placed at the top of the pole, so that when the pole is straight, the line is properly guided the full length thereof. As soon, however, as a fish is caught, the strain at the tip of the pole causes the latter to bend, thus throwing the guides out of alinement and causing the line to become deflected by the intervening parts of the pole. The line is thus caused to run in contact with the pole adjacent each guide, thereby greatly increasing friction on the line and in time causing wear on the pole.

The object of my present invention is to so dispose the guides for the line as to prevent contact of the latter with the pole at any time, said guides being positioned relatively to the reel so as to insure the most direct line of travel of the line from reel to tip with the least contact with surfaces.

I prefer to so mount the reel on the pole as to enable the same to be shifted laterally to a position in which it is balanced and to this end I provide a reel plate A having a lateral extension B between its ends, the latter being provided with lateral slots C for the passage of set screws D by means of which the reel frame E is secured thereto. The said reel plate A is removably secured to the butt section F of the pole in the usual manner, one end thereof being inserted in a pocket G of well known construction and the other end engaged by the longitudinally movable clamp collar H generally employed. In order to prevent the latter from releasing the reel I provide a spring latch consisting of a flat L-shaped spring I secured at one end to the butt section F, the other end thereof entering a recess in the pole when depressed out of its normal position to throw it out of the path of said collar H. The gear end of the reel is generally considerably heavier than the other end portion thereof so that by moving the reel laterally the position thereof can be adjusted to balance the same. The reel is preferably so mounted that the middle thereof laterally of its axis of rotation represented by the dotted line N lies from five-eighths to three-quarters of an inch to the left of the vertical plane of the axis of the pole. In this position the reel is practically balanced but if the operator so desires he may readily return the reel to its usual position so that the middle thereof registers with the plane of the axis of the pole. The operation of the guides is not affected by the position of the reel. My present invention however resides in the disposition of the line guides on the pole whereby friction on the line is reduced and to this end the eyelet guides J, K and L are disposed substantially at angles of forty-five, ninety and one-hundred thirty-five degrees respectively to the vertical plane of the axis of the pole, while the opening in the tip ferrule M is disposed in said plane on the lower side of the pole so that the line passes substantially helically from reel to tip. Said guides J, K and L project sufficiently far out from the surface of the pole to so guide the line as to keep it out of contact with the pole when the latter is straight but as soon as there is a pull on the line the yielding of the pole will throw the line entirely free thereof. The strain on the line being exerted on the lower portion of the tip of the pole also serves to exert a balancing influence on the latter.

In order to insure proper relative positions of the guides on jointed poles the male and female members of the joints thereof are provided with interfitting projections N and grooves O respectively which serve to prevent the relative rotation of the sections when assembled and also to prevent improper relative positions when being assembled.

The number of guides for the line may be obviously varied and their relative positions likewise varied according to their number.

The essence of the invention lies in the provision of what I term an anti-friction run of the line whereby casting and general manipulation is rendered more free and convenient.

I claim as my invention:

1. In a fishing pole, line guides disposed helically around the same from butt end portion to tip, the guide at the butt end portion being disposed on the upper and the tip guide at the lower side of the pole.

2. In a fishing pole, the combination with the reel disposed on the upper side of the pole, and the tip having an opening disposed substantially diametrically opposite the reel, of intermediate line guides disposed helically around the pole.

3. In a jointed fishing pole, the combination with the reel disposed on the upper side of the pole, and the tip having an opening disposed substantially diametrically opposite the reel, of intermediate line guides disposed helically around the pole, and inter-engaging means interposed in the joints between adjacent sections of the pole and preventing relative rotation of adjacent sections whereby the relative positions of the intermediate line guides are determined.

4. In a jointed fishing pole, the combination with the reel disposed on the upper side of the pole, and the tip having an opening disposed substantially diametrically opposite the reel, of intermediate line guides disposed helically around the pole, telescopic joints between adjacent pole sections, and means interposed in said joints preventing relative rotation of adjacent pole sections and maintaining the helical arrangement of the line guides.

In testimony whereof I have signed my name in the presence of two subscribing witnesses.

JOHN F. SCANLAN.

Witnesses:
RUDOLPH WM. LOTZ,
JOHN LOUGHLIN.